United States Patent [19]

Kortegaard

[11] Patent Number: 4,827,257

[45] Date of Patent: May 2, 1989

[54] IDENTIFICATION CIRCUIT

[75] Inventor: Per Kortegaard, Aalborg, Denmark

[73] Assignee: A/S Modulex, Billund, Denmark

[21] Appl. No.: 96,627

[22] Filed: Sep. 14, 1987

[30] Foreign Application Priority Data

Sep. 12, 1986 [DK] Denmark .............................. 4370/86

[51] Int. Cl.$^4$ ................................................ G06F 7/04
[52] U.S. Cl. ............................. 340/825.65; 340/825.52
[58] Field of Search ........................ 340/825.52, 825.65

[56] References Cited

U.S. PATENT DOCUMENTS

| 3,760,355 | 9/1973 | Bruckert | 340/825.65 |
| 4,114,138 | 9/1978 | Demers | 340/825.65 |
| 4,559,536 | 12/1985 | Olesen et al. | 340/825.65 |
| 4,596,983 | 6/1986 | Sjogren et al. | 340/825.52 |

Primary Examiner—John S. Heyman
Attorney, Agent, or Firm—Kane, Dalsimer, Sullivan, Kurucz, Levy, Eisele and Richard

[57] ABSTRACT

In a preferred embodiment (FIG. 6), an identification circuit comprises an input terminal (40), an output terminal (43), a combined counter and comparator circuit (39) with counter input terminals (38), an OR gate circuit (42) and a trigger circuit consisting of an inverter (44) and a multivibrator (41). The said components are connected so that rapid identification of an identification code represented by the signals on the counter input terminals (38) can be obtained with just a single input and a single output terminal. The output terminal on the gate circuit (42) may be kept at a high impedance by means of a signal on the intput terminal (40) so that a signal may be applied to the output terminal (43), said signal resetting the counter via the trigger circuit (44, 41). After resetting of the counter, the output signal from the gate circuit (42) follows an input signal on the input terminal (40) until reception of a number of input signals corresponding to the identification code on the code terminals (38). The invention also concerns an integrated circuit, in particular for use in connnection with a plate having rows and columns of mechanical coupling means for cooperation with a plurality of elements which can be mounted in various positions on the plate. The circuit is characterized in that the housing of the circuit is formed as such a building element and is moreover provided with electric contact areas to provide electric contact with electrically conducting areas in the plate.

6 Claims, 7 Drawing Sheets

IDENTIFICATION CIRCUIT

BACKGROUND OF THE INVENTION

The invention concerns an identification circuit having an input terminal and an output terminal as well as a memory element to store an identification code, and comprising a counter for counting pulses on the input terminal and a comparator for comparing the identification code and the value of the counter.

The invention is particularly related to an electronic board on which there may be placed a plurality of different marking elements in many different points of a matrix of serial buses. For this use, at least some of the marking elements must contain an electronic identification circuit so that it is possible to register the position of the marking element and its associated identification code.

The British Patent Specification No. 1 365 838 discloses a principle for identification of the number (or priority) of a data unit. This known art is expensive to implement and is not useful in connection with the above-mentioned positional determination.

In connection with a board of the above-mentioned type it is important that the marking elements, which contain an identification circuit and are usually present in a large number, are inexpensive, but on the other hand it is desirable that a minor number of marking elements can perform complicated data processing operations.

The object of the invention is accordingly to provide an identification circuit which is useful in a simple version both for the mentioned positional determination and identification determination but which can also be expanded to handle more complicated data tramsmissions.

SUMMARY OF THE INVENTION

This object is achieved in that the identification circuit is constructed so that the positional determination can be obtained merely by a few signal changes since the output signal corresponds to the input signal. The identification determination is responsive to the number of pulses on the input terminal, and it is important to note here that the counter may be reset at any time by means of a signal which is transmitted to the output. Particularly for the above-mentioned use, it is sufficient in many case just to perform the positional determination so that the average scanning time of the board can be reduced significantly. As will appear from the later description, in a fundamental form the identification circuit comprises very few logic components so that it is very reliable and inexpensive to produce.

The present invention further enables dynamic change of the identification code, e.g. by activating a switch on a marking element, or by a data processing operation in the marking element causing a change in the identification code.

As long as the counter has not counted up to the identification code, the output signal can correspond completely to the input signal and comprise a modified version of the input signal. The means provides for a direct reflection of the input signal in the output signal in a very simple manner.

The enables interconnection of the output terminals from a very large number of identification circuits. In a preferred embodiment, the circuit has an output impedance in the logic ET state.

The invention also serves to provide extensive data transport via the input and output terminals of the circuit. The said buffer circuit may be arranged as transmitter or receiver, and permit the transmission to be synchronous with external clock pulses.

The invention also concerns an integrated circuit, in particular for use in connection with a plate having rows and columns of projecting coupling studs, and a plurality of electrically conducting areas to provide electric contact with contact areas on other elements connectible with the plate. The integrated circuit may be a thick or thin film circuit or may be a single chip. The electrically insulating housing per se may also be a base for the doping process by which the electric circuit is produced, and it will thus be appreciated that it has been made possible for the marking element for the said board to be produced very cheaply and still be adapted for complicated data processing functions.

BRIEF DESCRIPTION OF THE DRAWINGS

The invention will be explained more fully by the following description of some embodiments with reference to drawing, in which FIG. 1 schematically shows an electronic board in connection with which the invention is particularly useful.

DETAILED DESCRIPTION OF THE PREFERRED EMBODIMENT

The invention will be described below in connection with an electronic board of the type appearing from the co-pending application Ser No. 096,614. To understand this use fully, the mode of operation of the board will first be discussed generally in connection with FIGS. 1–5.

Figure 1:
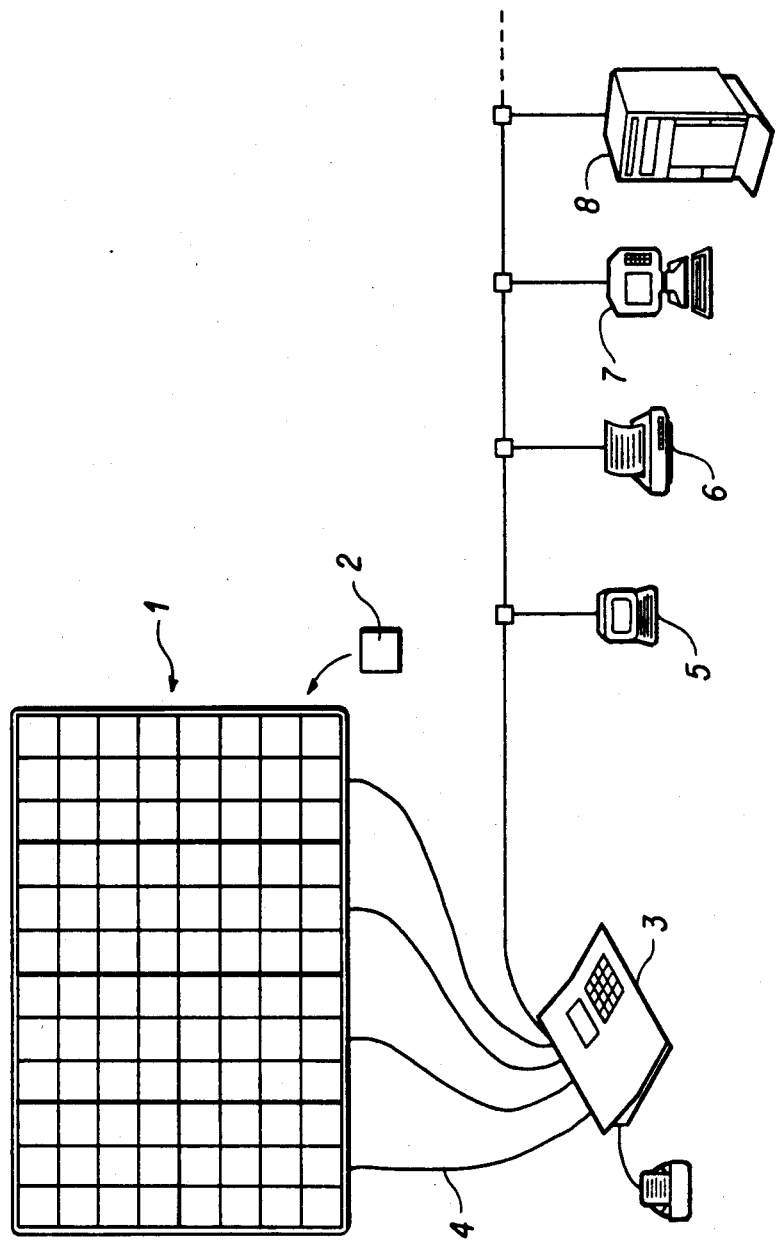

FIG. 1 shows a planning board 1 on which a plurality of marking elements 2 may be placed in a plurality of different positions. Through means incorporated in the board, a circuit 3 can detect partly the position and partly the type of the marking elements, and when the marking elements are provided with an identification circuit according to the invention, large information amounts may be exchanged via the lines 4 and a circuit 3 between many different types of marking elements and a plurality of outer units, such as a screen display 5, a printer 6, a PC 7, and primarily a data processing system 8 as well as optional further electronic means.

Figure 2:
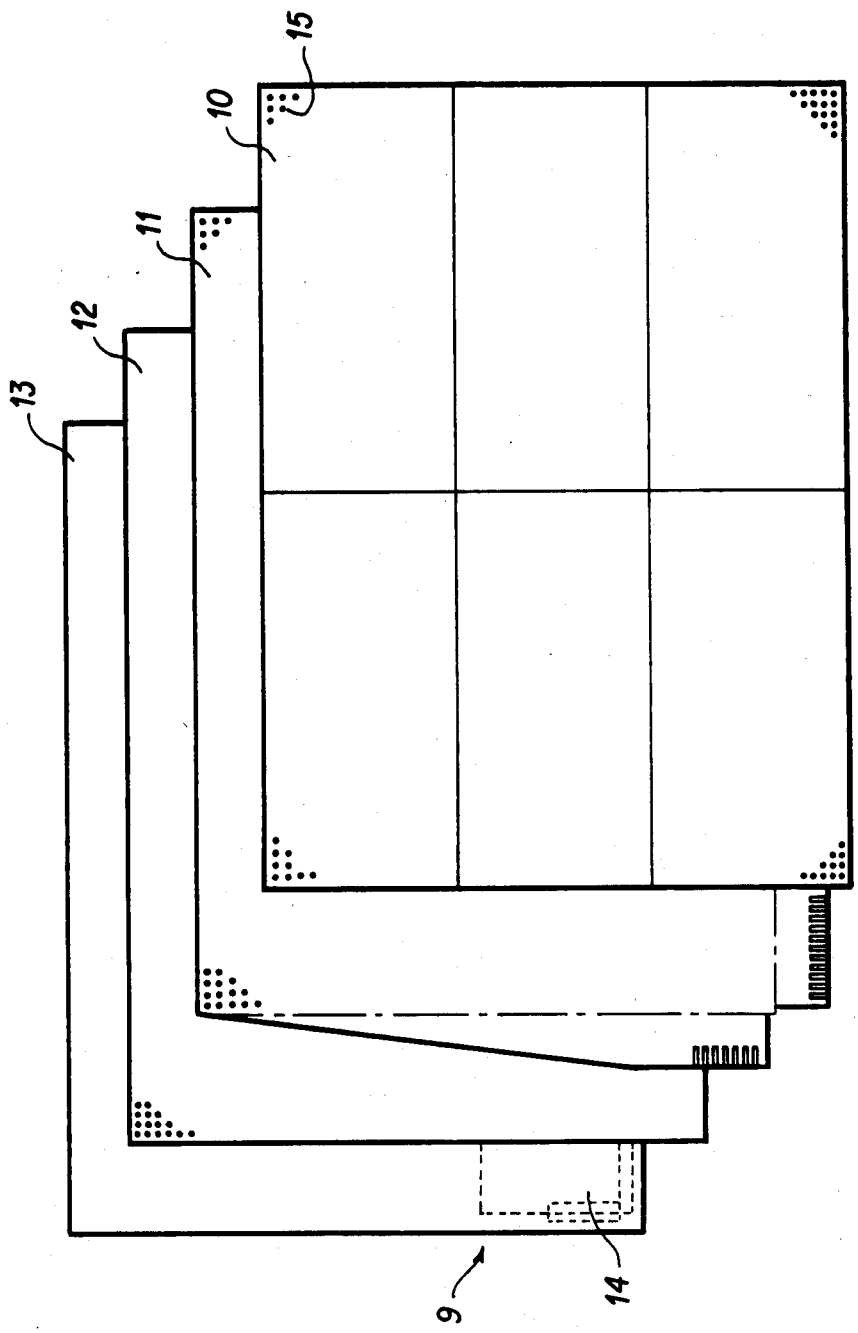
FIGS. 2–4 show details to explain the function of the board, FIG. 5. shows an embodiment of a marking element for use in connection with the board, FIG. 6. shows a first embodiment for a simple identification circuit according to the invention, e.g. for positioning in the marking element of FIG. 5, FIG. 7. is a very simplified view of an electric matrix for the electronic board, FIG. 8. shows another, more complicated embodiment of the identification circuit of the invention, FIG. 9. shows in more detail signal wave forms for the circuit of FIG. 6, FIG. 10. shows signal wave forms for the circuit of FIG. 8, while FIG. 11. shows a developed embodiment with respect to FIG. 5, which also serves to describe the integrated circuit of the invention.

FIG. 2 shows an embodiment of a board unit 9 comprising a front plate 10 provided with a modular pattern of coupling studs 15, a so-called flexprint 11, a rear plate 12 and a plate 13 for suspension of the board and for reception of a control circuit in the cavity indicated at 14. The plates 10-12 are arranged and assembled as appears from FIGS. 3 and 4.

Figure 5:
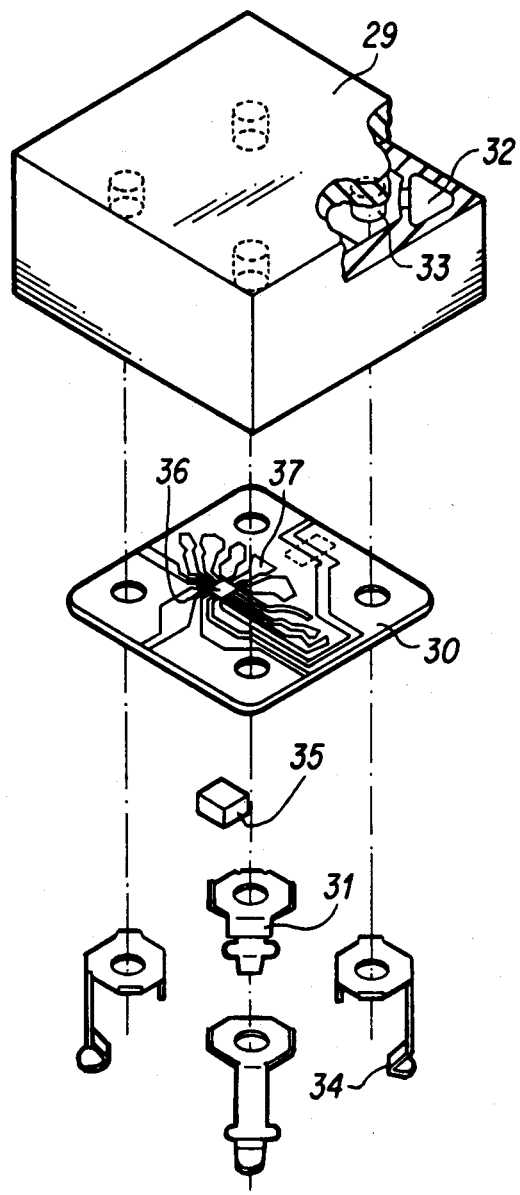

As mentioned, the plate 10 has a plurality of coupling studs disposed with a mutual modular distance and adapted to be received in a cavity in the underside of a marking element (FIG. 5). The coupling studs 15 are hollow and are open downwardly and laterally via a cut 16 extending in the full height of the coupling stud and over a fraction of its arc length. The underside of the plate 10 is provided with a plurality of guide pins 17 adapted to be received in guide holes 18 in the plate 12. The guide pins 17 are slightly longer than locking pins 19 on the plate 12, so that the guide pins ensure that the locking pins 19 hit the cavities in the coupling studs 15 exactly when the plate parts 10 and 12 are assembled around the flexprint 11.

The flexprint 11 comprises a flexible layer of electrically insulating material in which a plurality of electric conductors is applied by a technique known per se. The electrically conducting areas comprise partially punched flaps 20 flush with an associated coupling stud 15, and it will thus be appreciated that e.g. the flap 20 is pressed up into the cavity of the coupling stud 15 by means of the locking pin 19, so that the flap 20 is curved to firm engagement with the cylindrical surface of the coupling stud 19, thus providing electric contact via the cut 16 with the conductor or conductors in the flexprint 11 which are electrically connected to the flap 20. The other flaps are arranged similarly, and it can be seen in the embodiment shown that the cuts 16 are disposed in four mutually different angular sections, corresponding to four mutually insulated power paths in the flexprint, each of said power paths connecting all flaps which are positioned in uniform angular sectors in the coupling studs. For example, the flap 20 may be contiguous with an electric conductor 21, while the flap 22 is contiguous with an electric conductor 23, the latter conductors constituting X and Y data lines, respectively. The flap 24 may be connected to the electric conductor 25, while the flap 26 may be connected to a conductor 27 for feeding power supply to the marking elements. The flexprint may be produced by ordinary, known printed circuit techniques and by punching.

Figure 3:
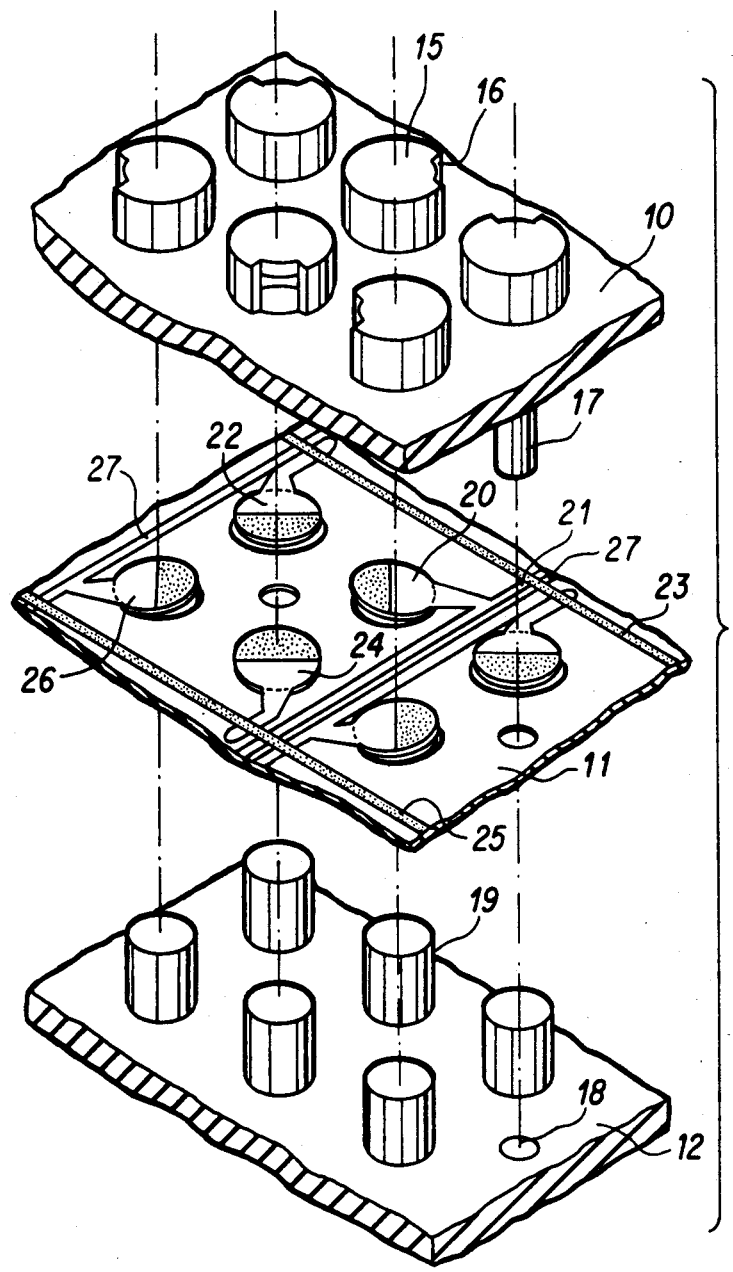
Figure 4:
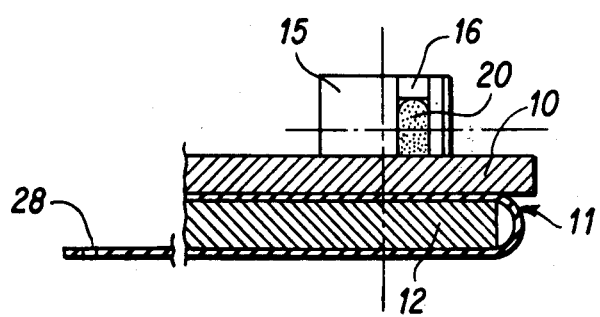

With reference to FIG. 4, which shows a section through the mutually mounted plates from FIG. 3, it will be seen how the flap 20 is accessible through the cut 16 for provision of electric contact with the X data conductor in the flexprint. Another expedient detail in the flexprint 11 appears from FIG. 4, as the flexprint 11 is bent along a section of the edge and has mutually isolated, electrically conducting areas which can readily be caused to cooperate with a terminal plug e.g. at 28 (compare also with the left corner at the bottom of the flexprint 11 from FIG. 2).

FIG. 5 shows details of a preferred embodiment of a marking element of the invention. For clarity, this marking element is not provided with visual texts or signs on the surface. The marking element comprises a housing 29 with a downwardly open cavity to receive a circuit 30 and to receive four adjacent studs 15 from FIG. 3, so that the housing 29 may be attached mechanically on the board. To provide electric contact between the circuit 30 and the flaps 20, 22, 24 and 26 shown in FIG. 3, the housing in FIG. 5 has four electrically conducting legs 31 which are mechanically guided in a cavity 32 and an attachment pin 33, and which are electrically connected to a conductor on the circuit 30. The contact face 34 of each leg can provide resilient contact with a flap from the flexprint via an associated cut 16.

The print board 30 may be adapted to receive an embodiment of the identification circuit of the invention in the form of an integrated circuit 35 at the location indicated at 36, so that power supply is fed via the contact legs to the circuit 35, and electric connection is established between an input terminal and an output terminal in the circuit and respective conductors in the board.

Figure 6:
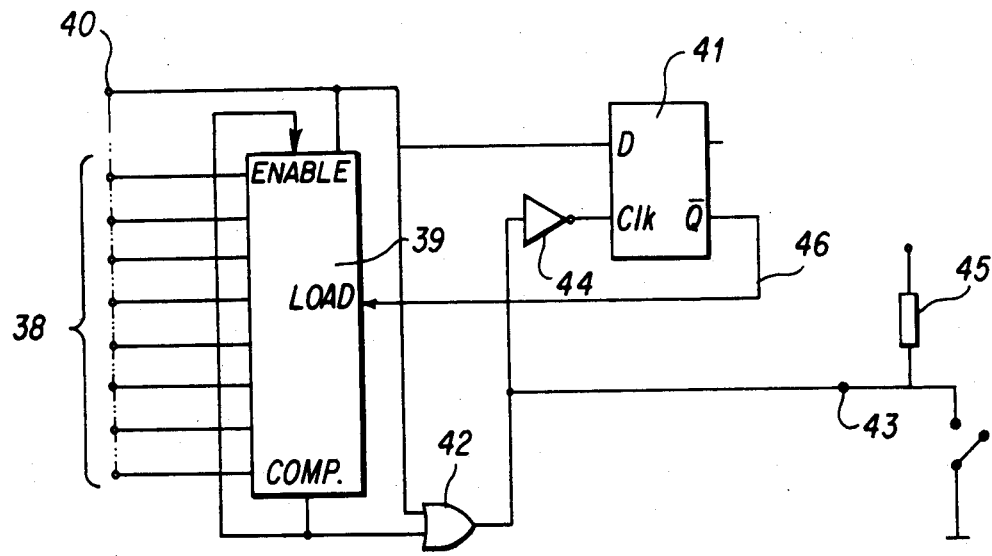

FIG. 6 shows a preferred, very simple and thus inexpensive embodiment of the identification circuit of the invention. The circuit comprises some inputs 38 which may be hard wired as shown by program paths 37 in FIG. 5, and which thus define an identification code for a combined counter and comparator circuit 39. The latter circuit receives input signals via a terminal 40, which is moreover connected to a D type multivibrator 41 and an OR gate 42, whose output is connected partly to an output terminal 43 and partly to the multivibrator 41 via an inverter 44.

The other input on the OR gate 42 is connected to the COMP output on the counter and the comparator circuit 39. The COMP output goes to a high level when the counter reaches the same value as the inputs 38, which causes the counter to be deactivated and the output terminal 43 to be high.

Since the OR gate 42 has an open collector output, it will have, in the active state, a very high resistance between the output terminal and ground, for reason the logic level in this state is defined by means of resistor 45. Consequently a signal may be transmitted to the output of the OR gate when it is active without the gate being overloaded. The signal is used for initiating the counter in the following manner. When using the output terminal 43 as an input terminal for a brief switch from high to low signal level while the terminal 40 is maintained at a high level, the multivibrator 41 can be triggered to produce a load signal on line 46. The load signal entails that the counter starts counting the number of signals on the input terminal 40, and as long as the count does not correspond to the identification code, the output signal on the terminal 43 will reproduce the input signal on the input terminal 40, but when the counter has counted to the identification code, the OR gate 42 causes the output terminal 43 to go to high level. since the COMP signal goes high and simultaneously inhibits the counter by means of the input EN. When such a circuit is contained in the marking element 47 shown in FIG. 7, the position in the A-B matrix and the identification code of the element can be detected very easily by means of the schematically shown circuits comprising partly a plurality of output gates A1, A2 . . . and a plurality of two-way communication gates B1, B2 . . . .

The circuit also serves to determine the position of the marking element 47 as the B3 gate immediately follows the signal applied from the A5 gate, which indicates that a marking element is present in this position.

It is noted that the position can be detected already after the first few signal changes on input and output, whereas the identification code cannot be detected until the input terminal has received a plurality of input pulses corresponding to the associated identification code.

Figure 9:
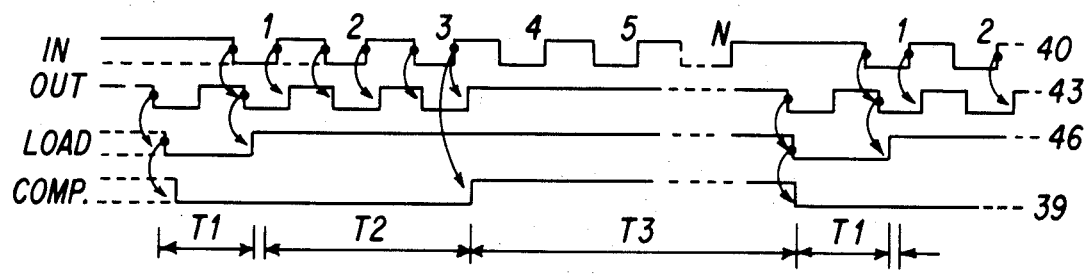

With reference to FIG. 9, an example of signal wave forms will be given to facilitate complete understanding of the mode of operation of the circuit of FIG. 6. FIG. 9 shows the signal wave forms at three periods of time T1-T3 for the signals on the input terminal 40, output terminal 43, the signal on the line 46 as well as the output signal from the comparator circuit 39, respectively. As stated before, the signal on the input terminal is kept at a high level, simultaneously with a brief signal change from high to low level being applied to the output terminal 43. This provides at load signal shown in FIG. 9 on the line 46 which is connected to the $\overline{Q}$-output terminal of the multivibrator, said load signal initiating the counter and the comparator 39 so that this changes output signal, cf. FIG. 9. Then the signal on the output terminal 43 follows the input signals applied to the input terminal 40, and assuming that the identification code of the circuit is equal to 3, the third transition from low to high level on the input terminal entails that the output signal of the comparator changes and then blocks transmission of the input signals to the output terminal.

The components included in the circuit of FIG. 6 are few and extremely simple, so that very inexpensive marking elements may be produced for the electronic board described above. As mentioned in the preamble, there may also be a need for a minor number of more complicated marking elements which can e.g. receive and/or transmit information. An example of such a circuit appears from FIG. 8, which shows another embodiment of the circuit of the invention.

Figure 8:
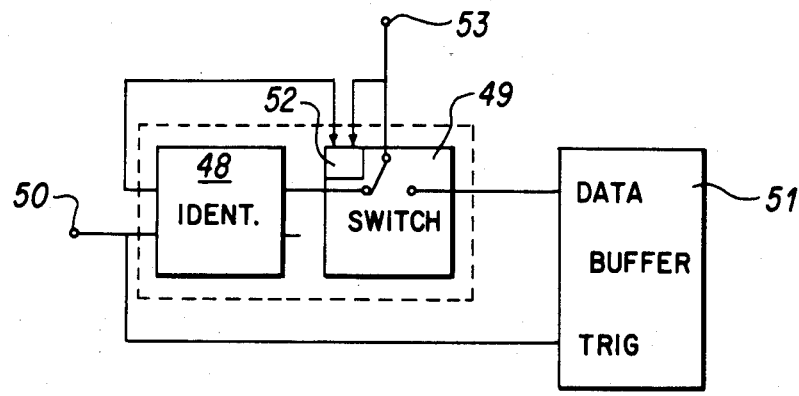
Figure 10:
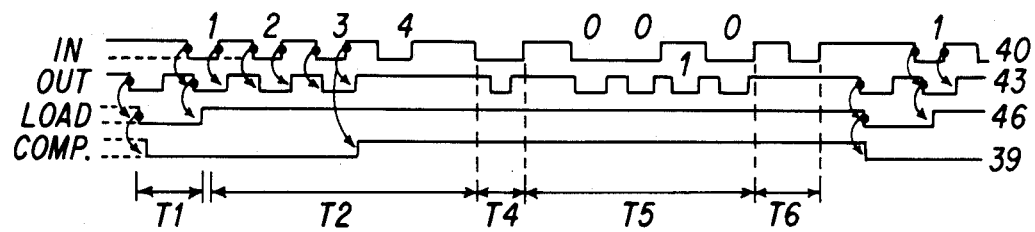

The circuit shown in FIG. 8 comprises an identification circuit 48 of the type shown in FIG. 6, an electronic switch 49, an input terminal 50, an output terminal 53, a buffer circuit 51 and a logic circuit 52 contained in the switch circuit 49. The circuit 52 is responsive to a predetermined combination of the input and output signals on the terminal 50 and 53, respectively, so that the output terminal 53 may be switched between the identification circuit 48 and the buffer circuit 51, respectively. This appears more clearly from FIG. 10, which shows the wave forms of the same signals as were described in connection with FIG. 9. The load period T1 and the identification period T2 thus correspond completely to FIG. 9, but instead of the inactive period T3 from FIG. 9, the combination of the input signals on both the input and the output terminals shown in FIG. 10 is transmitted during the period of time T4, so that the electronic switch immediately establishes connection between the output terminal 53 and a data terminal on the buffer circuit 51. The input terminal 50 is connected to the trigger terminal on the buffer circuit 51, so that data signals transmitted via the output terminal 53 are introduced into the buffer circuit synchronously with a clock pulse signal transmitted to the circuit via the input terminal 50. When the data transmission period T5 is over, another combination of input signals on both the input and the output terminal is transferred during the period of time T6, which is detected by the circuit 52, so that the electronic switch 49 breaks the connection between the output terminal 53 and the data input to the buffer circuit. Information may be transferred in this manner to a marking element, e.g. with a view to displaying information on a liquid crystal display.

In a further development, it is conceivable that information is to be transferred from e.g. a microprocessor in a marking element to the electronic board. This can e.g. be indicated to the board in that the microprocessor changes the identification code in the circuit 48, so that the control circuit of the board is switched to a receiving position where information is received via the input terminal 50 synchronously with a clock pulse signal transmitted by the board control circuit via the terminal 53. Such a mode of operation presupposes that both the A and the B circuits from FIG. 7 can transmit as well as receive information.

The greatest benefits of a board of the above-mentioned type are obtained in practice if the parts to be used in large numbers are inexpensive. What is in mind here is the marking elements, and it is therefore desirable that these can be produced very cheaply. This can be done according to the invention in that the marking element is produced as integrated as possible with the associated circuits.

In connection with FIG. 5 as was explained the integrated circuit 35, which was to be mounted on the circuit 30, which was in turn to be mounted in the housing 29. However, it will be appreciated that the production of the marking element can be rationalized considerably by providing the integrated circuit and any program paths directly on a film which is placed in the housing 29, or directly inside the housing. It is possible today, but still expensive to provide electronic circuits directly on a plastics base, such as the inner side of the housing 29, but it must be considered given that the technology will rapidly make this production rational.

Figure 7:
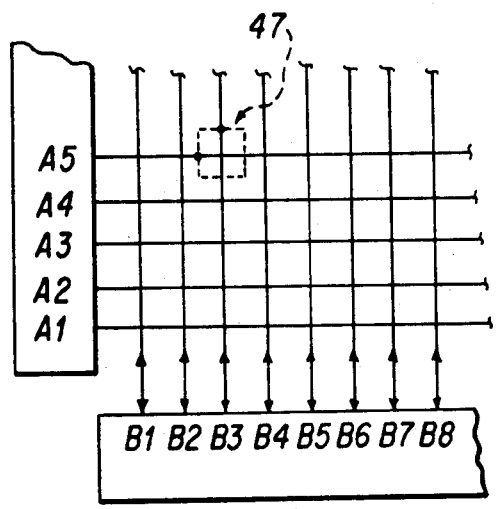
Figure 11:
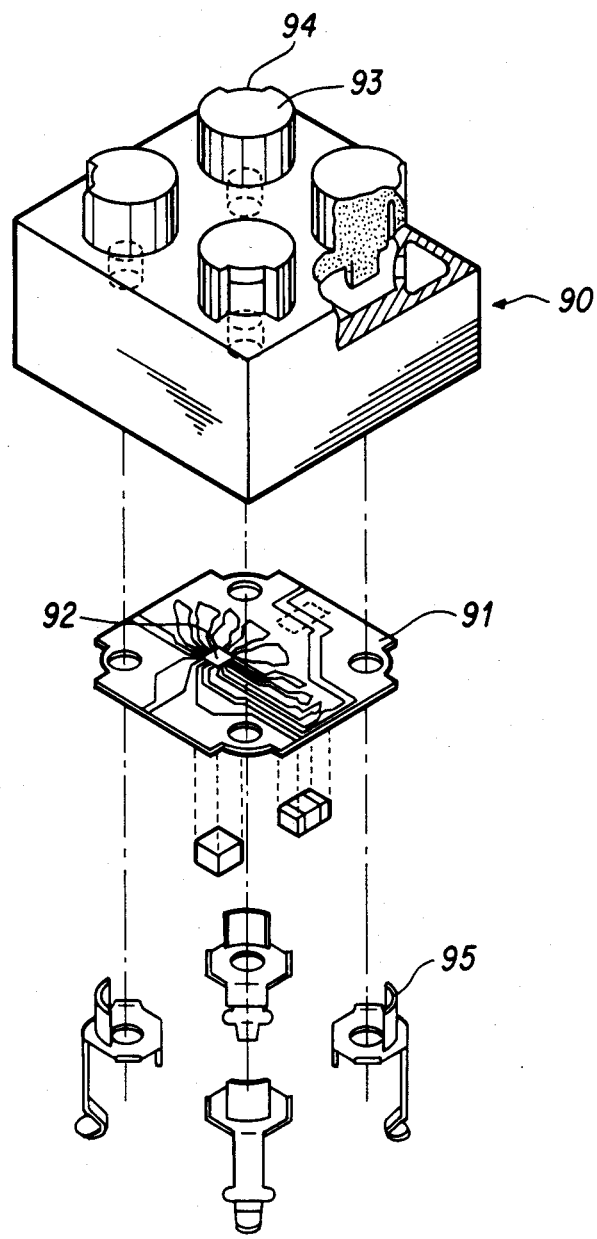

FIG. 11 shows an example of a marking element 90 containing a thick film circuit 91 carrying a microprocessor 92. The marking element 90 per se serves as a housing for the circuit 92, and the circuit is connected to the contact legs described in connection with FIG. 5 by means of electric connections. The marking element 90 also differs from the element 29 of FIG. 5 in that it is provided on the upper side with four coupling studs 93, each of which is provided with cuts 94 corresponding to the cuts 16 in FIG. 3, to receive a contact part 95 projecting from each of the contact legs. An integrated circuit is provided hereby, the housing of which appears as an element mechanically connectible with other elements. It is noted that the number of coupling studs on the housing of the integrated circuit is not limited to four, but may e.g. be six, so that, in addition to two power supply terminals, there might be two inputs and two outputs. With reference to FIG. 7, an associated board should contain the A and B circuits as well as C and D circuits and the associated matrix lines for the additional terminals on the marking elements.

I claim:

1. An identification circuit having an input terminal and an output terminal, a memory element to store an identification code, a counter for counting pulses on the input terminal and a comparator for comparing the identification code and the value of the comparator, characterized by a gate circuit adapted to produce on the output terminal a signal responsive to the signal on the input terminal of the circuit as long as a number of pulses on the input terminal corresponding to the identification code has not been received since initiation of the counter, and a counter initiating trigger circuit having an input terminal which is connected to the output terminal of the identification circuit.

2. A circuit according to claim 1, characterized in that the memory element is a write memory.

3. A circuit according to claim 1 or 2, characterized in that gate circuit is an OR gate whose inputs are connected to the input terminal and the comparator, respectively.

4. A circuit according to claim 3, characterized in that the OR gate has a high output impedance in one of its logic states.

5. A circuit according to claims 1 and 2 characterized by a logic circuit connected to the output and the input, respectively, a buffer circuit and an electronic switch adapted to couple the output terminal to the terminal of the buffer circuit in response to the logic circuit.

6. A circuit according to claim 5 characterized in that the buffer circuit has a trigger terminal and a data terminal and the trigger terminal of the buffer circuit is connected to the input terminal and the data terminal of the buffer circuit is connected to the electronic switch for coupling to the output terminal.

* * * * *